United States Patent [19]

Ahmed

[11] 4,199,402
[45] Apr. 22, 1980

[54] PLASMA ENERGY PRODUCTION

[76] Inventor: Abul A. M. Ahmed, 1111 Army-Navy Dr., RiverHouse No. 1 Apt. B 306, Arlington, Va. 22202

[21] Appl. No.: 659,681

[22] Filed: Feb. 23, 1976

[51] Int. Cl.$^2$ .................................................. G21B 1/00
[52] U.S. Cl. ............................................................ 176/3
[58] Field of Search .................. 176/1, 2, 3, 5, 9, 4; 315/111.1–111.7

[56] References Cited

U.S. PATENT DOCUMENTS

| | | | |
|---|---|---|---|
| 3,085,173 | 4/1963 | Gibon et al. | 315/111.7 |
| 3,094,474 | 6/1963 | Gale | 176/1 |
| 3,113,082 | 12/1963 | Imhoff et al. | 176/1 |
| 3,386,883 | 6/1968 | Farnsworth | 176/1 |
| 3,445,333 | 5/1969 | Lecomte | 176/1 |
| 3,480,806 | 11/1969 | Berberich | 176/1 |
| 3,607,627 | 4/1971 | Furth et al. | 176/3 |
| 3,663,362 | 5/1972 | Stix | 176/4 |
| 3,723,246 | 3/1973 | Lubin | 176/1 |
| 3,728,217 | 4/1973 | Dandl | 176/3 |
| 3,755,073 | 8/1973 | Haught et al. | 176/1 |
| 3,808,550 | 4/1974 | Ashkin | 176/1 |

OTHER PUBLICATIONS

Erda 28 (1/31/75) pp. 1–13.
NSENAO 58(2) (1/75), pp. 107–120.
Nuclear Technology, vol. 20 (12/73), Leonard, pp. 161–178.
Conf-721111 (11/72), Leonard et al., pp. 918–930.
Websters 7th Collegiate Dictionary (1963), p. 648, Controlled Thermonuclear Reactions, Glasstone et al., (6/26/61), pp. 145–156.
MATT-1050, 8/74, pp. 526–529.
Technology Review (12/76), pp. 21–46.
WBS Dimensions (6/77), pp. 25–26.
Science News, vol. III (1/22/77), p. 53.

*Primary Examiner*—Samuel W. Engle
*Assistant Examiner*—S. A. Cangialosi
*Attorney, Agent, or Firm*—Gerald K. Kita

[57] ABSTRACT

The disclosure relates to energy production by generating an ion stream by laser energy and injecting the ions within a closed loop accelerator. Numerous nodes about the path of the accelerator densify the ions at minimum cross-sections causing substantial kinetic pressure from particles which are accelerated into the nodes together with injected electrons to form a plasma. The accelerator path contains the ions preventing their escape into the atmosphere. The accelerator recycles the ions continuously within the closed loop path for repeated fusion reaction at the nodes.

2 Claims, 8 Drawing Figures

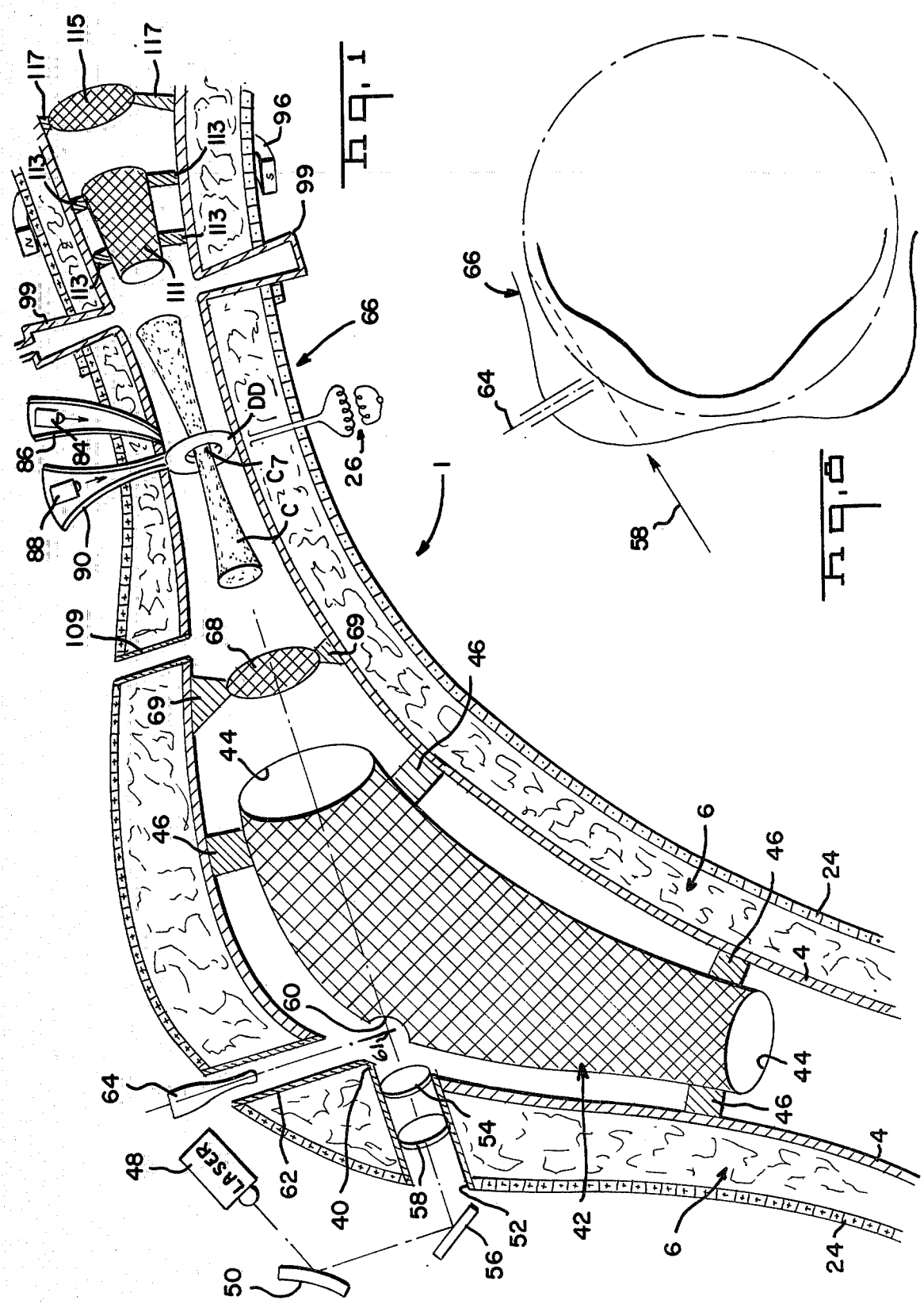

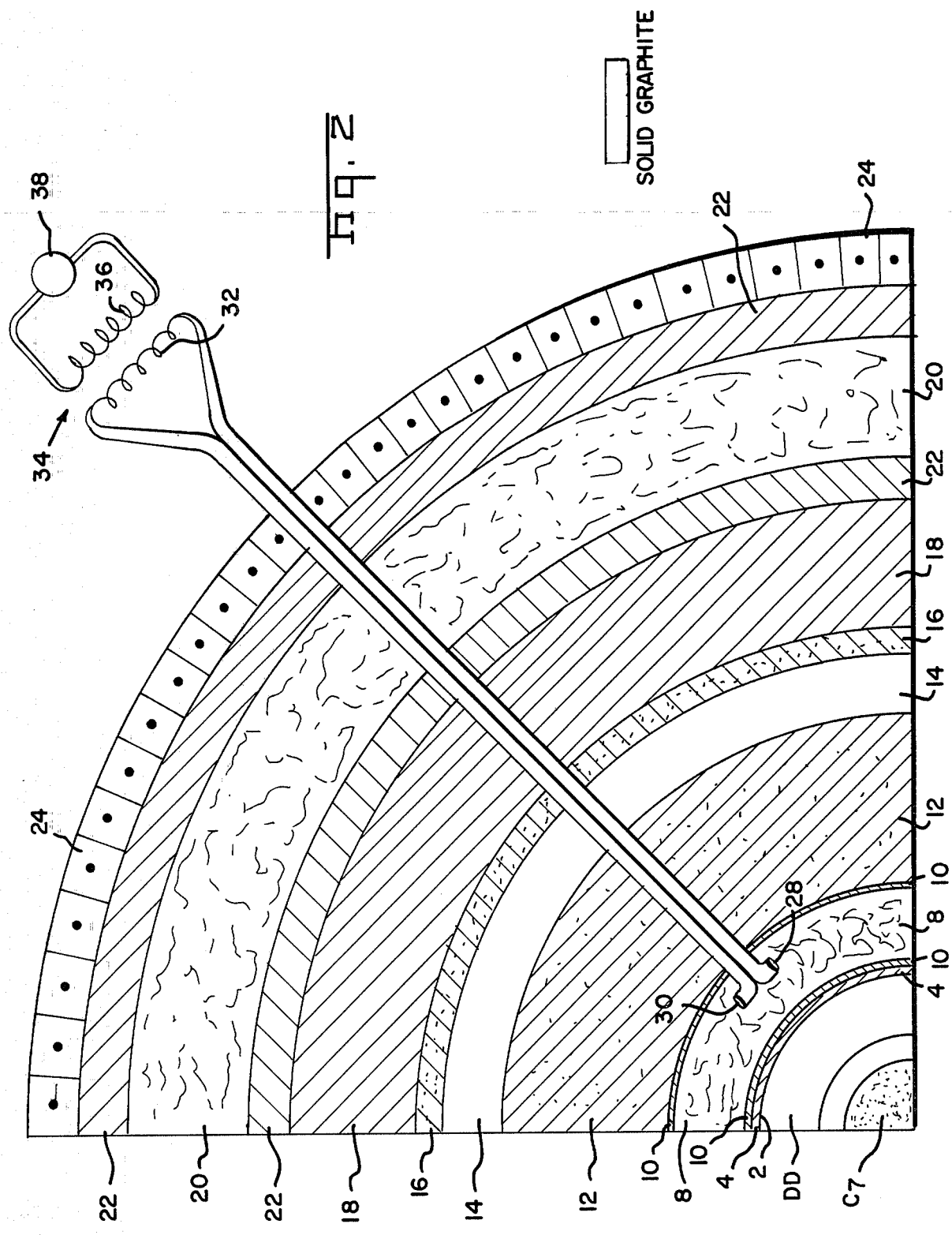

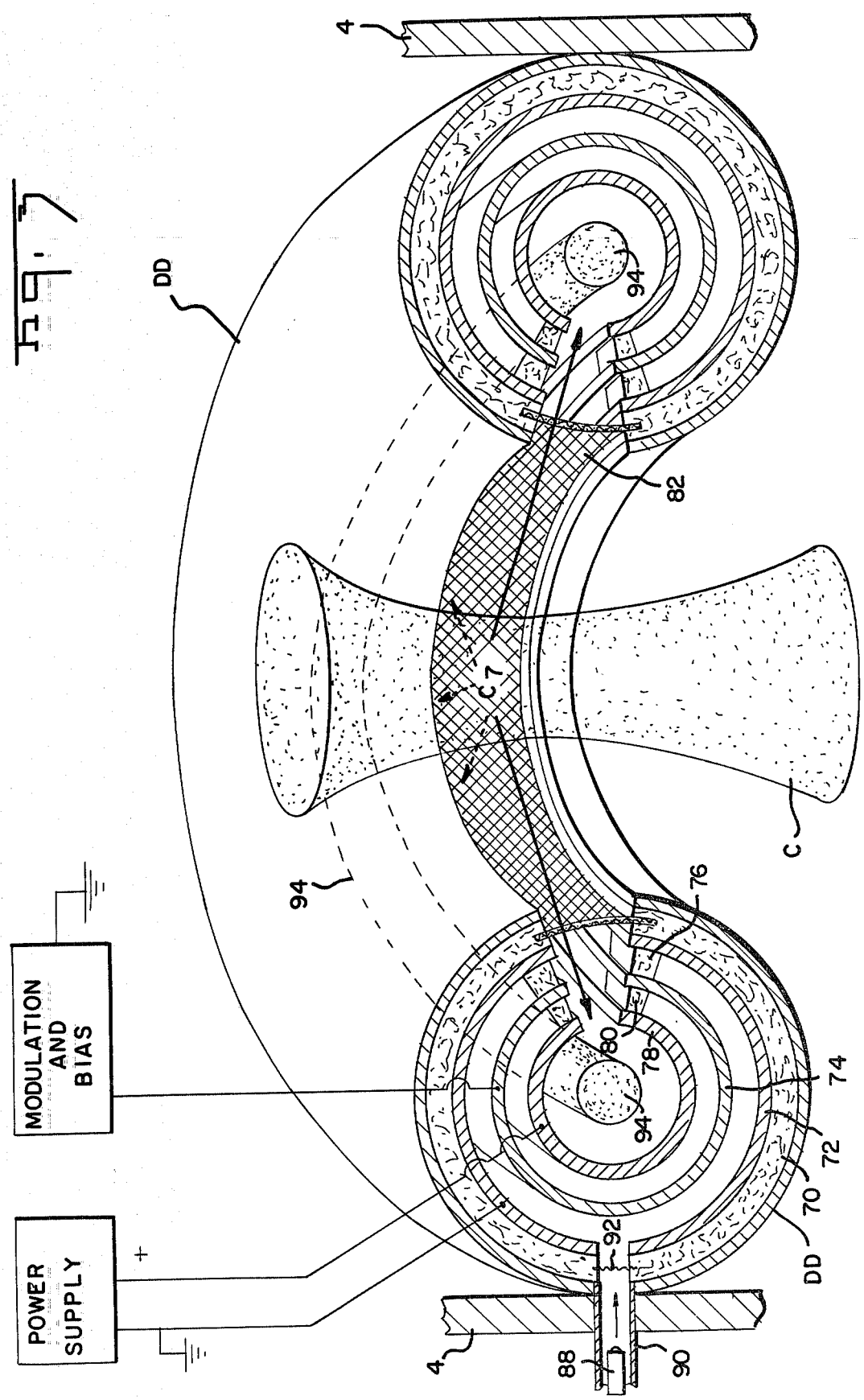

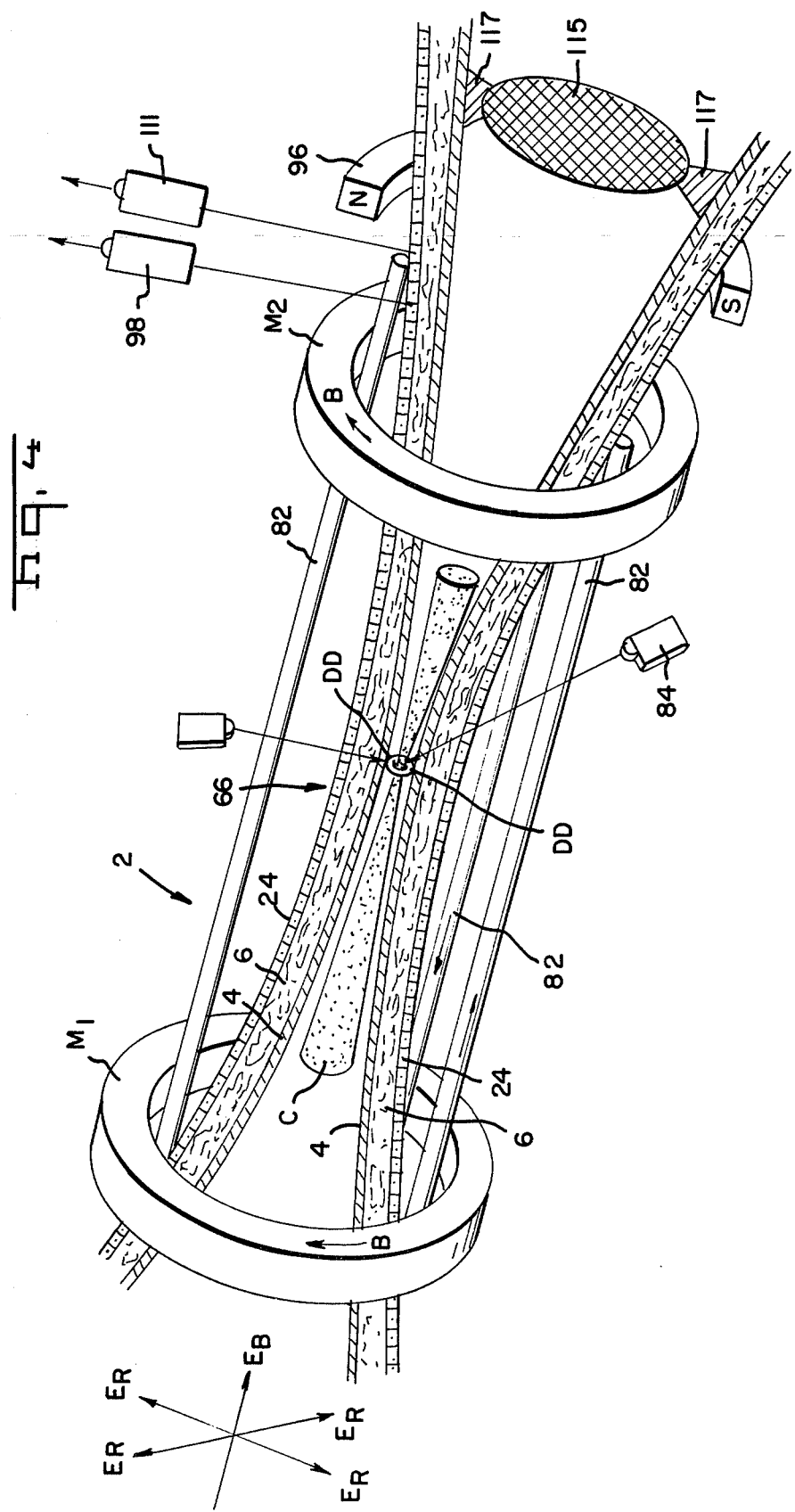

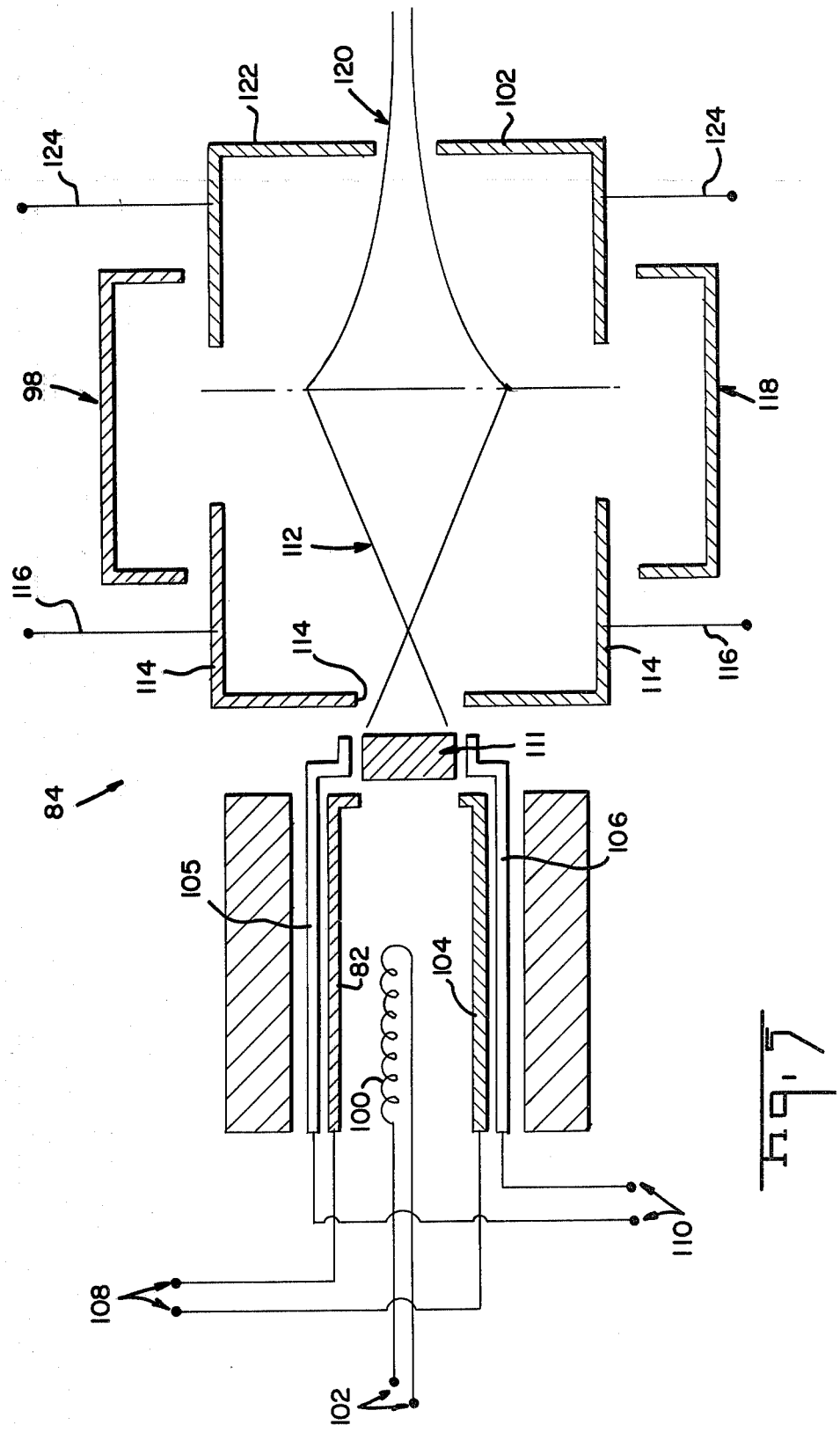

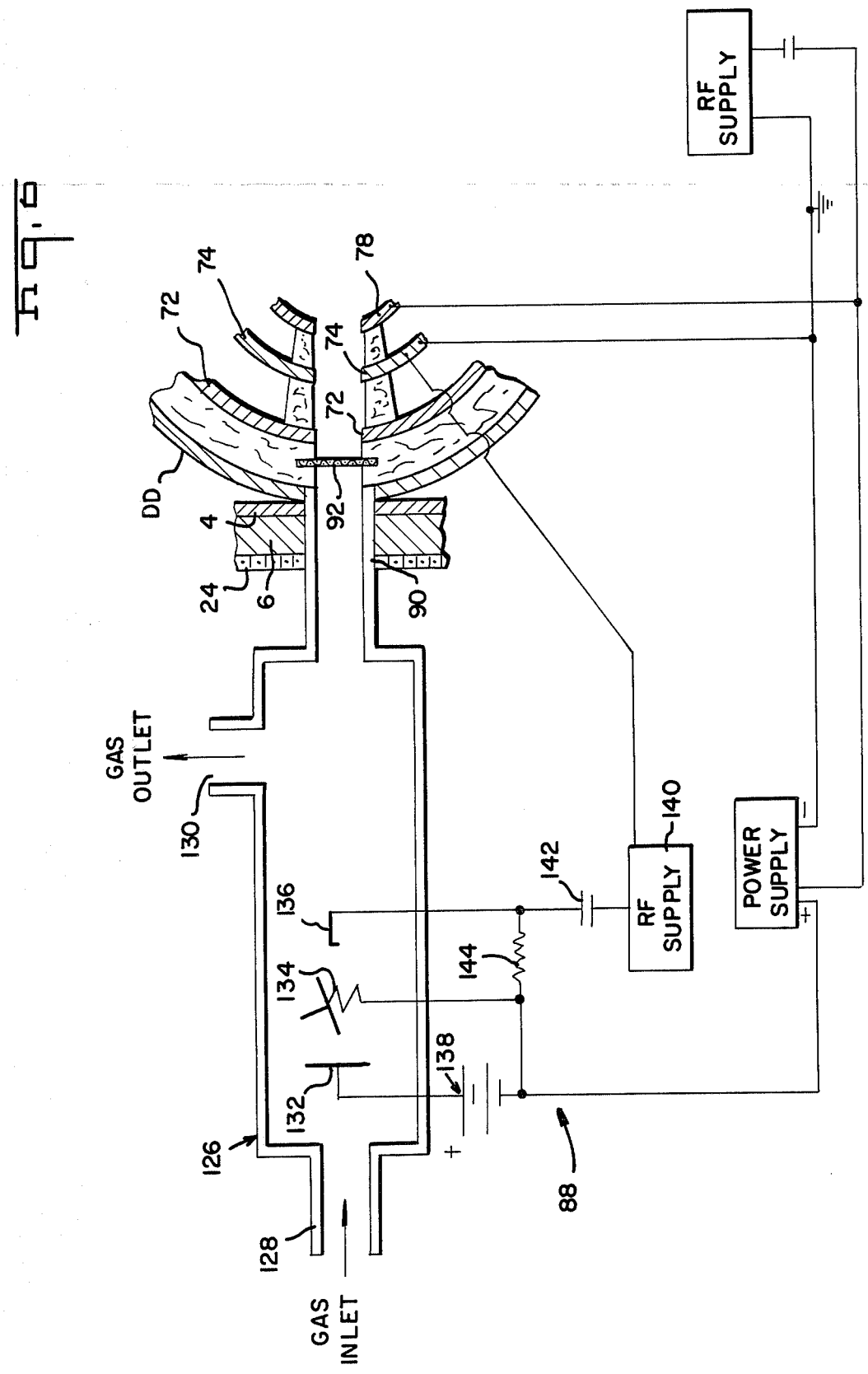

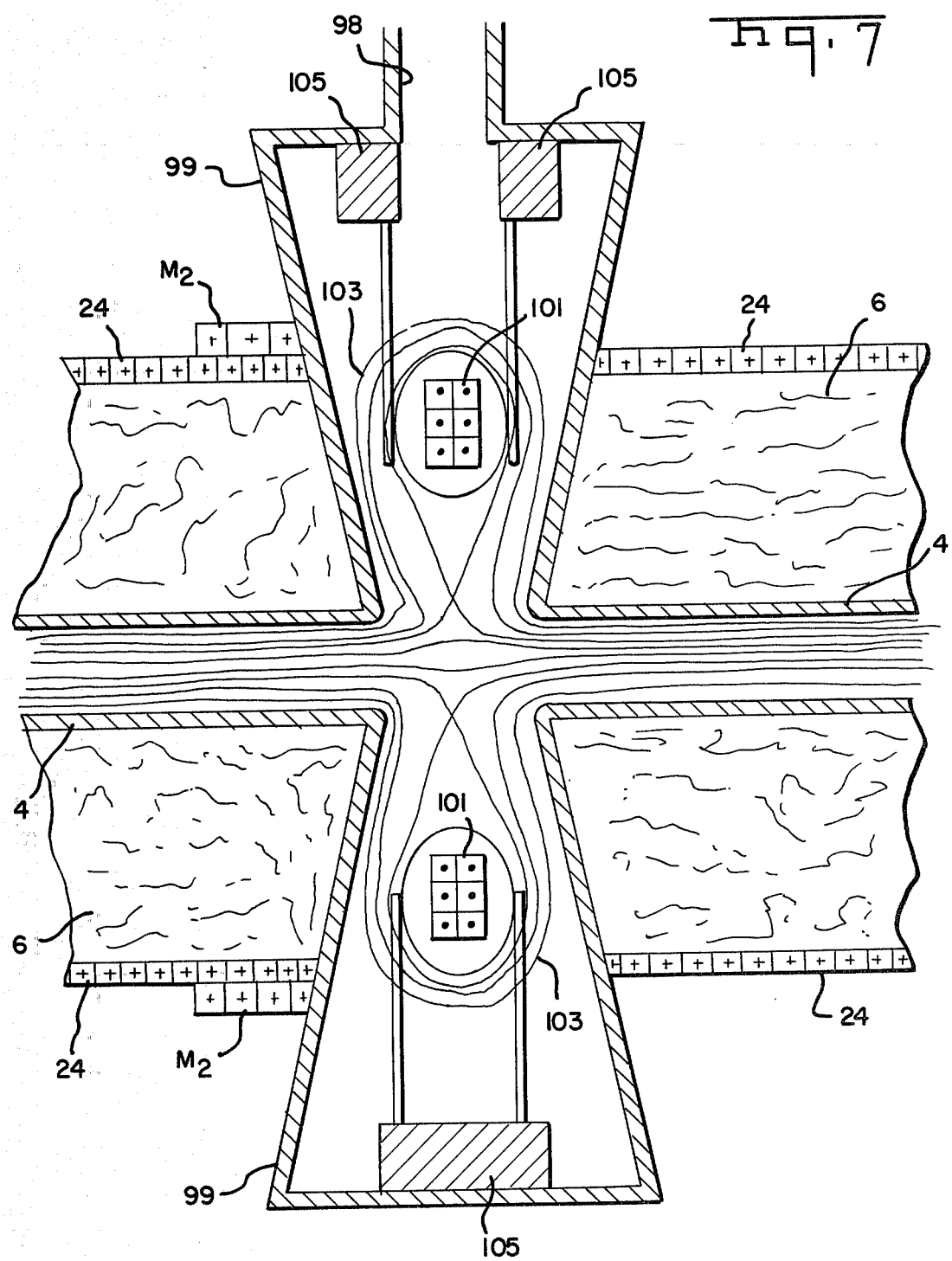

PLASMA ENERGY PRODUCTION

BACKGROUND OF THE PRIOR ART

The feasability of generating electricity by plasma formation has been demonstrated by two processes, the subject of considerable experimentation. According to one process, it has been found that gasses, particularly monatomic helium agron or neon, can be ionized to produce a plasma which, when confined and passed through a fixed magnetic field, induces a useful voltage. Various gas formulations seeded with additional ions have been used with limited success. In another process under study, Duterium and Tritium are bombarded with laser energy to produce large quantities of useful heat for driving turbines. Tritium by-products are also produced which can be recycled in the process. The disadvantage of this process resides in the need to confine the ions within a limited volume, i.e., a "plasma bottle" for a sufficient time period in order that the ions are compressed or, more specifically, imploded by laser energy to release useful heat. The heat produced is accordingly a function of the ion density and the confinement time of the ions within the plasma bottle. It has been found that electromagnetic radiation at the plasma boundary is a serious drawback to successful fusion over extended periods of time and also to obtaining efficient energy conversion. The leakage phenomenon, known as the Bremsstrahlung effect, reduces the plasma temperature such that the desired temperature of fusion cannot be attained for a time period to satisfy the well known Lawson criterion. The escaped ions and radiation also are lost to the atmosphere together with their potential for energy production.

BRIEF DESCRIPTION OF THE INVENTION

The present invention relates to plasma generation for either nuclear fusion or magnetohydrodynamic production by eliminating the drawbacks of the prior art plasma systems wherein the Bremsstrahlung effect presents itself to lower the temperature of the plasma or to extinguish a fusion process. The present invention further accommodates the transient kinetic nature of the ions and escaping radiation, recycling the kinetic energy, radiation and mass of the ions to sustain plasma generation rather than permitting escape of the ions. As a further feature, the positive particles may be passed through a fixed magnetic field to produce a magnetohydrodynamic effect as an alternative to fusion. These features are accomplished by confining the particles in a closed loop path of an accelerator using a multiple number of sections or locations about the closed loop path to provide nodes of relative minimum cross-section at which the ion mass is accelerated at high velocity. The presence of a magnetic field concentrates the high velocity particle mass into a small volume or well densifying the mass and slowing the particles. Electrons are injected to neutralize the space charge of the particles at each node section and to create a plasma. A tube of circulating electrons encircling the minimum cross-section purposely causes ion migration back and forth perpendicular to the force field of the magnetic well at the minimum cross-section. When the magnetic field of the well or particle trap is collapsed or released the ions exit the nodes and disperse into a lesser mass density along the accelerator path. The reduction in both kinetic energy and mass density will lower the exit temperature of the ions to insure that the fusion reaction takes place only at the node locations. Electrons and other waste products can be extracted from the accelerator by conventional techniques, retaining only ions, Duterium or Tritium. The accelerator path permits repeated recycling of the ions continuously through the numerous nodes. The magnetic field present at the nodes is used to compress the ions to raise the temperature necessary for fusion.

According to another feature of the present invention, the ions exiting each of the nodes are considered as a flow of positive particles for production of direct current by magnetohydrodynamic or other conventional techniques.

OBJECTS

It is therefore an object of the present invention to provide a process for generating useful energy from a plasma of ionized particles continuously recycling the ions in order to repeatedly produce plasma at a plurality of minimum cross-sections within an accelerator.

Another object of the present invention is to provide a process for nuclear fusion wherein a plasma mass is continuously regenerated with ions and with electrons injected into the minimum cross-sections of an accelerator.

Another object of the present invention is to provide a process for generating a plasma suitable for nuclear fusion or magnetohydrodynamic production by using an accelerator to recycle and accelerate ions in a return path to the plasma mass to sustain a temperature sufficient to satisfy the Lawson criterion.

DESCRIPTION OF THE DRAWINGS

FIG. 1 is a schematic longitudinal section of a portion of an accelerator.

FIG. 2 is a schematic partial cross-section of the accelerator at a node portion.

FIG. 3 is a longitudinal section of a node portion of the accelerator.

FIG. 4 is an elevation partially in section of a node portion of the accelerator.

FIG. 5 is a schematic elevation in section of an ion injector.

FIG. 6 is a schematic elevation in section of an electron injector.

FIG. 7 is a schematic elevation in section of an impurities extractor.

FIG. 8 is a diagrammatic plan view of the accelerator.

DETAILED DESCRIPTION

With more particular reference to the drawings there is shown generally at 1 a portion of a closed loop accelerator, the entirety of which has an interior chamber 2 in the form of an annulus having alternating maximum and minimum cross-sections. The accelerator wall 4 comprises a 1 cm. to 0.5 cm. thickness of any suitable high temperature resistant stainless steel. As shown in FIG. 2 the wall 4, referred to as the primary wall or the vacuum wall, is concentrically surrounded by shielding 6, known also as the blanket.

SHIELDING

The shielding comprises a combination of concentric layers selected by taking into account several factors. A first layer for vacuum wall cooling comprises a 9 cm. thick liquid layer 8 of LiF or KF or a suitable mixture of both. This layer is contained within an annulus having inner and outer walls 10 of Niobium (Nb), which are 0.5 cm. in thickness. The next layer 12 comprises a 20 cm. thick layer of 96% Li, 2% $BeF_2$, known as the inner moderator and breeder. The next layer 14 comprises 7 cm. thick graphite and known as the outer moderator. The next layer 16 is a 3 cm. thick solid layer of 98% Li and 2% Nb which absorb thermally active neutrons. These layers described thus far comprise a primary attenuator or blanket portion of the shielding. Additional layers comprise, a 15 cm. thick layer 18 of lead serving as a gamma ray absorber and a 25 cm. thick layer 20 of insulation preferably in a vacuum chamber with walls 22 of any suitable thickness. These additional layers comprise the radiation shield portion of the shielding 6.

Operation of the shielding is as follows. Neutrons in the accelerator tend to escape through the wall 4. The layer 8 provides initial cooling for the wall 4. The inner moderator and breeder layer 12 absorbs some of the neutrons, which are high in kinetic energy, to produce or breed tritium through reaction of the neutrons with liquid Li. Hence the kinetic energies of the absorbed neutrons are absorbed or moderated. The tritium produced will pass characteristically through the Nb tubing which comprises the containing wall for the layer 8 and can be extracted by any conventional extractor method from the liquid layer 8.

The graphite layer 14 thoroughly absorbs or moderates the kinetic energy of the neutrons passing through the layer 12. Thus when the neutrons escape to or reach the layer 16 they contain solely thermal energy which can be extracted. The additional layers 18, 20 and 22 minimize the heat escape generated by the escaping neutrons. The lead absorbs gamma radiation escaping from the primary attenuator.

Also shown is a power extractor shown generally at 26 comprising stainless steel inlet tube 28 and outlet tube 30 through which the liquid coolant 8 is circulated. Also the tubes 28 and 30 are passed through the primary loop 32 of a heat exchanger shown generally at 34. A suitable liquid such as water or liquid KF or LiF is circulated in the secondary looped tube 36 of the heat exchanger 34. Heat is drawn off in the form of a power turbine shown schematically at 38.

As shown in FIGS. 1 and 2 the shielding 6 is surrounded by conventional Nb type magnetic coil windings 24 which generate force lines along the accelerator annular axis propelling charged ions and electrons around the chamber of the accelerator from left to right in FIG. 1. These windings comprise the primary coil of the accelerator.

At each maximum cross-section ions are created and are circulated within the accelerator chamber. A magnetic field created in the conventional manner by the coils 24 so constructed and arranged, prevent the ions being propelled from left to right around the accelerator chamber from hitting the wall 4. The ions are preferably duterium and tritium. Hereafter the use of duterium and tritium only will be discussed.

ELECTRON EXTRACTOR

Within each maximum cross-section 40 of the accelerator is located an electron extractor 42 fabricated from an open mesh stainless steel grid in the form of a relatively short section of a curved paraboloid open at its ends 44. The electron extractor may be supported by insulation shown schematically at 46 from the wall 4.

LASER

A laser 48, or any suitable number thereof, is mounted in any suitable mechanical fashion externally of the shielding 6. If required, any projection system for the laser is schematically represented by a mirror 50 also mounted outside the shielding 6. A stainless steel tube 52 through the shielding 6 is sealably surrounded by the shielding 6. A high temperature glass window 54 covers a small opening in the accelerator wall 4. The laser beam is projected by the mirror 50 and additional mirror 56, if required, and focused by a lens 58 in the tube 52 to project through the lens and to an opening 60 in the electron extractor 42. The laser is advantageously a Neodyminium-glass laser having a wave length of 1.06$\mu$. The peak power output is advantageously of between one and 10 kilo joules with a maximum pulse width of $10^{-9}$ seconds maximum. The laser beam is focused to impinge a maximum cross-sectional area of about $25 \times 10^{-4}$ $cm^2$ on the surface of a Duterium-Tritium pellet at 61.

Each pellet is injected through a stainless steel tube 62 sealably encircled by the shielding 6. A flexible stainless steel nozzle or tube 64 may be removed after completing insertion of the pellet or pellets as desired.

The laser beam impinges the pellet or pellets and produces electrons, duterium ions and tritium ions. The laser energy also gives initial kinetic energy to the ions propelling them toward a relative minimum cross-section or node 66 of the accelerator where fusion is to take place. Also the laser energy imparts initial high temperature to the ions prior to their reaching the critical temperature for fusion to take place. The electron extractor is charged so as to attract the electrons produced by the laser, removing the electrons from the ions propelled toward the node 66. A cathode grid 68 (a virtual cathode) located at the exit opening 44 of the electron extractor, and supported by insulation 69 against the wall 4, also pulls the ions toward the node 66. The accelerator windings 24 also propel the ions toward the node 66.

Ions will cycle around the accelerator and will enter the open end 44, the entrance end, of the electron extractor, and will exit through the exit opening 44. The virtual cathode at the exit opening 44 passes positive ions therethrough toward the node 66. The electrons, if any are present, are drawn off by the extractor which is kept at positive potential with respect to the virtual cathode.

TUBE DD

To generate an electron cloud, as shown in FIGS. 3 and 4, a tube DD in the form of an annulus is located at the center of the node 66. The tube is made of stainless steel and is attached to and contacts the inner periphery of the wall 4. The inner surface of the tube is coated with a layer of insulation 70. An annulus of stainless steel forms a cathode 72 and is supported inside the tube DD by the insulation 70. A mesh grid in the form of an annulus forms an electrically biasing grid 74. The grid is supported by strips of insulation 76 from the cathode. A mesh anode 78 in the form of an annulus is supported inside the grid 74 by insulation strips 80. As shown the components described are provided with a continuous opening around the circumference facing the common center of curvature of the concentric annuli. The opening is covered by a grid 82 supported entirely by the insulation 70. As shown schematically the cathode 72 and anode 78 are connected electrically to a power supply providing the requisite polarity voltages. A modulation and bias voltage source is shown connected to the grid 74. The inside of the cathode is coated with a photoelectric material such as germanium or aluminum which will emit copious quantities of electrons in response to ultraviolet radiation which is spontaneously present in the node 66 in response to positive ions entering the tube DD.

COILS $M_1$ AND $M_2$

Outside the shielding 6, as shown in FIG. 4, are located coils $M_1$ and $M_2$. For clarity the coils are shown separated on either side of the node 66. However, it is understood that the coils $M_1$ and $M_2$ both are distributed along the length of the accelerator wall so they surround the accelerator in the vicinity of the node 66, encircling the tube DD. The coils are magnetic superconducting coils of $Nb_3Sn$ producing a magnetic field. Rods 82 running lengthwise of the accelerator are located outside the shielding 6 and are within the coils $M_1$ and $M_2$, as shown. Only a few rods are shown, whereas there are many, all around the node and encircling the accelerator. The rods are superconductive $Nb_3Sn$ and create magnetic fields to compress the ions to a minimum B, as will be explained.

As shown in FIGS. 1, 3 and 4, an electron injector 84, located within a stainless steel tube 86, which is joined to the wall 4 at a 45 degree angle, communicates with the interior of the accelerator in order to inject electrons to the center of the DD tube. Any desired number of tubes 86 and corresponding injectors 84 may be provided. An ion injector 88 is located in a stainless steel tube 90 which extends through the wall 4 and the stainless steel wall of tube DD, as shown in FIGS. 1 and 3. The tube 90 is attached to the tube DD and communicates with the interior of the tube through a hole in the insulation 70 and the cathode 72. A grid 92 supported totally by the insulation 70 can be charged at an appropriate time to prevent escape of electrons or ions from the tube DD.

OPERATION OF TUBE DD

When ions are propelled from left to right in FIG. 1, the coils $M_1$ and $M_2$ are turned on and their magnetic fields trap the ions C longitudinally within the accelerator at the node 66 and compress them to form the minimum radial configuration within the center of the tube so that the ions do not touch the DD tube and thereby tend to escape from the magnetic well or trap created by the coils $M_1$ and $M_2$. The rods 82 are turned on to compress even further the radial configuration to the minimum B configuration (mathematical model) at $C_7$, thereby making the magnetic well deeper. The electron injector 84 injects electrons into the deep magnetic well or trap neutralizing the space charge of the ions thereby preventing their escape from the well or trap. Ultraviolet radiation will be present as is well known by quantum mechanics principles and will cause electrons in copious quantities to be emitted from the electroluminescent cathode 72. The grid 74, at positive potential with respect to the cathode and negative with respect to the anode 78, accelerates the emitted electrons toward the center of the toroidal tube DD to form a toroidal electron cloud 94. The cloud is maintained because the copious quantities of emitted electrons will continuously accelerate toward and then past the anode, neutralizing the space charge of the anode and thereby eliminating the anode attraction for the electrons in the cloud. Further, the grid will form its own image smaller than and concentrically within the anode further keeping the electrons in the cloud. The presence of the dense electron cloud, continuously regenerated with emitted electrons, causes the ions in the plasma to make trips or excursions at right angles to the axis of the accelerator back and forth, first toward the electron cloud reducing the ion density in the well, and then back toward the well to re-establish the correct ion density for a neutral space charge of the plasma. The confinement time of the ions has been increased because of this arrangement such that fusion occurs. Heretofore the ion-ion collisions within a "magnetic bottle" has caused the ions to escape before fusion was produced. Here, the product of the increased confinement time and the ion density is sufficient to satisfy the Lawson criteria (mathematical model) for fusion to occur.

The ion injector is not necessarily utilized for the above to occur. However, ions are injected to cause electron emission if the ion density and the consequent ultraviolet radiation thereof is desired to be increased or adjusted. The ions injected directly into the tube DD through the tube 90 will speed toward the anode, pulling emitted electrons and accelerating them past the anode toward the center of the tube DD to form the electron cloud. The electrons will accelerate past the ions also according to quantum mechanics principles to form the cloud. The ions will tend to form a shell around the electron cloud. However, the electron to ion ratio yet increases as the distance toward the center or focus of the DD tube, thereby at the center the electron density is greatest, resulting in the desired cloud.

Subsequent to fusion, the heat produced is extracted by the power extractor 34, pumping the cooling fluid 8 which has absorbed the heat transferred through the wall 4 in the vicinity of the node 66. The magnetic well is released by shutting off the coils $M_1$ and $M_2$ and the rods 82, allowing the particles, i.e., waste products of fusion, electrons and ions to escape from left to right in FIG. 1 from the node 66. The ions speed away and pass through magnetohydrodynamic coils, illustrated schematically at 96 in FIG. 4. The waste products of fusion are extracted by a pump having an inlet shown at 98 in FIG. 7. The waste products are in vapor form and, being heavy particles will fall out of the escaping stream of particles toward an enlarged annular portion 99 integral with and projecting outwardly of the wall 4, allowing their removal by the pump. The portion 99 is also out of the longitudinal portion of the accelerator after coils $M_2$. An extractor field coil 101 encircles the escaping ion stream causing eddy current flow 103 of magnetic field. The waste products, in vapor form, are disturbed by the flow 103, striking collector plates 105, supported by insulation 107, where they are drawn off by the pump.

The pump is a vacuum pump of the type known as, Diversey, Mag-ion, Model MI-900, manufactured by the VEECO Instruments Inc., Plainview, N.Y. The pump is guaranteed operative to $10^{-12}$ torr. But by heating the ions before being trapped in the magnetic mirror, outgassing at elevated temperature will approach $10^{-13}$ torr at a pump speed of 100 liters per second. Other tubes, one shown at 109, can be strategically placed for additional pumps to outgas the accelerator. Upon leaving the node and passing through extractor 98 the ion stream passes through an electron extractor 111, in the shape of a paraboloid with open ends, supported on the wall 4 by insulation 114, and similar to the extractor 42, is appropriately charged to remove electrons from the ion stream. The ions then pass through the coils 96. The magnetic field strength of the coils depends upon particle density. For: $N \approx 10^{14}$ to $10^{15}$ cm$^{-3}$; $\beta \approx 10$ K Gauss. For: $N \approx 10^{-19}$ cm$^{-3}$; $\beta$ will be over a Mega Gauss. A virtual cathode 115, supported by insulation 117 operates like cathode 68 to propel ions toward the next node of the accelerator.

ELECTRON INJECTOR

The details of the electron injector 84 are shown schematically in FIG. 5. The injector 84 includes a heater coil 100 with its electrical leads 102. The coil 100 is encircled by a cathode 104, in turn encircled by a grid 106. Electrical leads 108 for the cathode and 110 for the grid are shown for connection to suitable bias voltages. Emitter material shown at 111 emits electrons when heated which electrons are focused in a stream 112 through an opening 114 in a first anode 114 provided with electrical leads 116. Any well known electron lens system, shown schematically at 118 is used to form a convergeant beam of electrons emerging from the limiting aperture 120 formed at the opening of a second anode 122, having electrical leads 124. In accordance with accepted knowledge, the diameters of the encircling anodes 114 and 122 influence the focal length of the lens 118. Most important is the ratio of voltages impressed upon the anodes in order to obtain a desired convergence of the electron beam emitted from the limiting aperture. Also required is the potential difference between the second anode 122 and the cathode to be greater than that between the first anode 114 and the cathode. The electron beam is inside and directed along the tube 62 for electrons to be injected into the tube DD.

ION INJECTOR

The ion injector 88 is shown in FIG. 6 as having an envelope 126 having an inlet 128 for the introduction of any suitable gaseous source of ions. A gas outlet is shown at 130. Internally of the envelope there is illustrated schematically an anode 132, a grid 134 and a cathode 136. A D.C. source 138 biases the anode positive with respect to the grid 134. An R.F. supply 140 is connected directly to the grid 74 of the tube DD, through a capacitor 142 to the cathode 136, and through a resistor 144 to the grid 134. The envelope 126 also includes the tube 90 connected directly to the tube DD. The positive side of a power supply is connected to the anode 78 of the tube DD and to the junction of the grid 134 and the source 138. The power supply negative side is connected to the cathode 72. Another RF supply is connected between the cathode 72 and the anode of the tube DD as shown. The aperture of the outlet 90 comprises any well known ion optical system which collimates and directs the ion stream through the open mesh anode 132. The envelope 126 and the accelerator may have the same vacuum pressure since they open into each other. Controlled quantities of Duterium-Tritium gas are introduced in the inlet 128. Residual gas is exhausted via the outlet 130. Space charge between the anode, grid and cathode produce the ions which are directed into tube DD.

A schematic section of a relative minimum section 66 is known as a magnetic mirror system. The plasma stream is shown at C. $E_B$ is the magnetic lines of force of the accelerator. $E_R$ represents electric induced vectors of force perpendicular to $E_B$. The coil current is shown in circular path about annular $M_1$ and $M_2$. A hollow circular, looped tube DD is located about the focal plane center AA of the minimum section 2. An electron cloud is generated by conventional techniques within the tube DD. This gives the radial vector $E_R$ due to the electron cloud generation perpendicular to the $E_B$.

Ions are heated initially to about $10^{8\circ}$ K. before being tapped in the magnetic mirror system. And as they are accelerated or brought to the focal plane the electrons are injected at 66 so as to create a plasma and the magnetic field B is switched on or pulsed in the form of a minimum B magnetic mirror configuration to trap the ions in the form of a plasma. Various conventional methods of trapping can be used, taking into account the injection angle of the ion stream to make the loss cone of the ion mass as small as possible. Also the electron cloud is generated in the tube DD and this creates a radial vector $E_R$ acting at C which is at right angles to $E_B$. This causes rotation of the plasma at C, and due to the electrons and ions "trips" through C, the rotational energy is also transferred into thermal energy which helps in heating the plasma. Heating the plasma also occurs by magnetic compression by $E_B$. The presence of $E_R$ also serves to increase the kinetic energy of the particles at right angles to B; this reduces considerably the escape of plasma through the mirror ends $M_1$ and $M_2$ resulting in longer confinement time for the plasma. An electrical discharge through tube DD is created to increase the particle density at C to satisfy the Lawson criterion.

MODIFIED MIRROR SYSTEM

As pointed out before, the tube "DD" holds the electron cloud so that the oscillations of charged particles at right angles to the magnetic field takes place and this contributes a higher velocity to the particles perpendicular to the lines of force, thereby trapping the particles more in the magnetic well.

In order to create a higher density of particles at the focal plane, the space charge of the accelerated ions have to be slightly neutralized by injecting electrons even before they come to the focal plane and then completely neutralizing it when they reach the focal plane, thereby creating the required plasma. Further increase in the density of particles at the focal plane can be achieved by injecting neutral particles by the ion injector at the focal plane at right angles to the magnetic field lines. These neutral particles will be ionized by the plasma already entrapped inside the magnetic well and also by oscillating discharge through the tube "DD" at right angles to the magnetic field lines. Tube "DD" thus performs two functions, e.g., 1. It acts as a trap for the plasma as explained above and
2. It acts as an ionizer for the neutrals which are injected to increase the density of particles at the focal plane.

The required fusion temperature at the focal plane is generated by adiabatic magnetic compression, or other suitable conventional techniques, e.g., laser beam, etc.

As the magnetic well trap is released, the positive particles flow through the tube toward the maximum cross-section of the tube where a negative grid has been placed to create a virtual cathode. As soon as the positive particles arrive at the virtual cathode, the acceleration device for the ions is switched on so as to bring them back at the focal plane at the minimum cross-section. During the passage of positive particles from the focal plane to the maximum cross-section a diverter is used which filters off all the impurities and and other by-products of fusion, leaving only duterium and tritium ions. The process is thus repeated again and again. When the depletion of the duterium and tritium ions becomes considerable, as shown by a measuring device at the maximum cross-section of the tube, fresh ions are introduced at the maximum cross-section to make up for the depletion.

During the passage of particles from the focal plane to the maximum cross-section of the tube, the electrons are also extracted off from the stream of positive particles; thus the flow of positive particles alone can also be utilized in the direct generation of electrical power.

The sequence of operations between the focal plane at the minimum cross-section and the maximum cross-section of the tube can be repeated all along the total path of the tube as designed.

The field inside the plasma is not always zero and the ratio of "$\beta$" of the plasma pressure to the magnetic pressure is important in confinement studies; it is of great importance that in a practical reactor the "$\beta$" should be high—(15% or so). $\beta$ is dependent upon particle density.

For: $n \simeq 10^{14}$ to $10^{15}$ cm$^{-3}$
  $B \simeq 10$ KGauss
For: $n \simeq 10^{19}$ cm$^{-3}$
  $B \geq$ Mega gauss The first loss process is that due to diffusion "D" across the lines of force where "$D\perp$"$\sim nTe^{-\frac{1}{2}}B_\sim^{-2}10^{-1}$ cm$^2$/sec. where n=particle density $T_e$=electron temperature and B=magnetic field.

Unfortunately, anamolous diffusion which is often called Bohm diffusion is observed ($D_B$), where $D_B \sim 1/16$ KT/eB where
  e=electronic charge
  K=Boltzman's constant
  T=plasma temperature This is actually due to low frequency electric field fluctuations in the plasma arising from what are called microinstabilities and are particularly based on drift waves. $D_B \simeq 10^5$ cm/sec. and is too high.

It is therefore important to keep the microinstabilities ver low, so that acutal diffusion rate to that given by $D_B$ is less than 1/100.

The differential drift of the ions and electrons give rise to gross instabilities, which in turn give rise to large scale motions of the plasma across the lines of force. Also, excursion of particles larger than the Larmor radius enhance collisional diffusion across the magnetic lines of force.

All the above instabilities are reduced considerably by introducing the magnetic well geometry with the modifications as indicated, wherey achieving the following:
  (a) very deep magnetic well
  (b) short lines of force
  (c) high $\beta$ (15%)

In the mirror system the confinement depends on the conservation of magnetic moment of the gyrating particles. As this is destroyed by collisions, the confinement time is limited to about the ion-ion collision time.

The trips of electrons and ions across the electron cloud and through the center of the magnetic well, actually make the well very deep and prevent the (a) differential drift of ions and electrons and
(b) microinstabilities The differential equation for the ion and electron trips through the center of the magnetic well can be written as this:

$$-\frac{d\phi}{d\nu} + \frac{d^2\phi}{d\nu^2} = K_1 \left( \frac{1}{\sqrt{\phi}} - \frac{2}{\sqrt{1-\phi}} \right)$$

where
$\phi = V/V_{C1}$
$\nu = \text{Log}_e\, r_{c2}/r$
$V_{C1}$ = sometimes voltage due to escess positive ions at the center of the well and other times due to excess of electrons at the center of the well.
v = running voltage
r = running radius
$r_{c2}$ = radius of the electron cloud $$K_1 = \frac{2N_e I_e}{4\pi E_o \sqrt{2\phi/me}\ V_{C1}^{3/2}} = 2N_e I_e / 4\pi E_o \sqrt{\frac{2e}{M_e}}\ V_{C1}^{3/2}$$

$N_i$ and $N_e$ are the number of ion and electron tips respectively.
$I_i$ = measured ion current
$I_e$ = measured electron current
$n_i$ = ion mass
$m_e$ = electron mass
e = electronic charge
$E_o$ = dielectric constant The actual size of the magnetic well can be scaled up or down depending upon the particle density, gyrating radii of the particles around the magnetic field lines and the strength of the magnetic field used. All the magnetic wells are located at the minimum cross-sections of the device, as indicated in the drawings.

At the nodes 66 the heat from fusion can be extracted by a conventional extractor 34 for electrical power production by conventional techniques. It is noted that the entire outer periphery of the accelerator 1 is covered with the shielding 6 which traps neutrons, electromagnetic radiation and other particles using their energy for supplementing the energy extracted by the extractor 34.

At the exit of each node the positive particles diverge and become less dense and some kinetic enery is lost. All electrons are extracted by the electron extractor; and all fusion by-products and impurities are extracted by the diverter or extractor leaving only duterium and tritium positive ions for recirculation in the accelerator.

The positive ions are then drawn away toward the virtual cathode as described. The particle density of the ions is measured and any deficit is resolved by injecting added ions by the injectors at 64. The kinetic energy lost by the ions by their passing through a magnetic field indicated schematically at 96 is extracted creating direct current production by magnetohydrodynamic techniques or other conventional techniques.

The following equations hold true for the present invention.

ION PATH

The accerator has been so designed as to contain the envelope of the ion beam which can be mathematically expressed in the form of an integral equation at any point "Z" as follows:

$$Z = \frac{1}{S2}$$

where 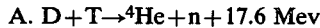

$S = (E_o M_o^2 / e p_o)$
$L = a/a_o$
$a_o$ = diameter of the ion beam at the minimum cross-section
$a$ = diameter of the ion beam at any point
$p_o$ = space charge density at the minimum cross-section
$E_o$ = dielectric constant
$m$ = mass of the ion
$e$ = electronic charge
$v$ = velocity of the ion =
$L = 1$ at $Z = 0$ and $L' = 0 = dL/dZ$ Thus the maximum and minimum in the path of the ions can be determined using the above equation, of course, the ion desnity will be minimum at maximum cross-section and maximum at minimum cross-section as shown in the diagram.

RELEASE OF FUSION ENERGY

A. $D + T \rightarrow {}^4He + n + 17.6$ Mev

Where n = neutrons, D = Duterium, T = Tritium and $^4$He = helium.

Here "n" is used to supplement the tritium breeding reaction as

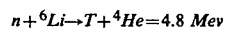

where $L_i$ = Lithium

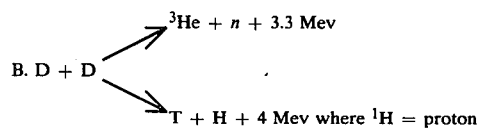

This is supplemented by reactions between $^3$He, T and D and energy yielding neutron capture reactions. Reaction (A) has the largest cross-section and provides easy confinement.

CONDITIONS (1) The energy of the colliding nuclei must exceed about 5 Kev thus ion temperature $T_i \approx 10$ Kev.

(2) Nuclei must be confined at these energies for a time "$C_t$" such that nuclear energy released exceeds the energy used in heating the ions. Hence the condition necessary is written as:

$$p_n C_t \gtrsim 10^{14} \; C_m{}^{-3}S_{ec} \quad \text{(Lawson criterion)}$$

where $p_n$ = number of nuclei per cubic centimeter (3) As the ratio of the scattering cross-section to the fusion cross-section varies more steeply than $1/T_i 2$, higher the $T_i$ better the fusion cross-section probability. Thus at lower $T_i$ nuclear velocities must be largely randomized (as it happens at the minimum cross-sections of the ion envelope) in order to satisfy the Lawson Criterion. Less randomized velocity spectrum is permitted at temperatures as high as 1 Mev due to large reduction in scattering cross-section.

Taking into account the above three conditions, we can formulate nuclear power output as:

(a)

$P_n = 10^{14} - 10^{15}$ cm$^{-3}$
$T_i \approx T_e \approx 10$ Kev
where $T_e$ = electron temperature
$C_t \approx 1$ sec.
$N_P$ = nuclear power output
$\approx 5 - 500$ W/cc (b)

$P_n \approx 10^{14}$ cm$^{-3}$
$T_i \approx 100$ Kev
$C_t \approx 1$ sec.
$N_p \approx 100$ W/cc
Here minimum scattering is required.

(c)

$P_n \approx 10^{16}$ to $10^{20}$ cm$^{-3}$
$T_i \approx T_e \approx 10$ KEV
$C_t \approx 10^{-6} \sim 10^{-1}$ sec
$N_p \approx 1$ MW/cc This is easily achieved in our focusing device at the minimum cross-section of the ion envelope. Here pressure becomes very high and already at $P_n = 10^{19}$ cm$^{-3}$ magnetic fields exceeding $10^6$ gauss will be required. Since in our system ions keep on circulating lower "$P_n$" can be used as power can be extracted at each minimum cross-section and direct electric current can be extracted during the passge of the ions from one minimum cross-section to the next maximum cross-section. The ion envelope can be designed in such a way that only the initial ions like $D + D$ or $D + T$ are made to circulate through the system again and again till the ion density is depleted below the Lawson Criterion. At this point, a fresh input of ions can be injected into the system at maximum cross-section. At the minimum cross-section the by-products of fusion are filtered out by diverters.

At each minimum cross-section, the positive ion space charge is neutralized by injecting a circulatory electron current so as to create the plasma which is then compressed by the magnetic field to create fusion; magnetic field is operated in such a way that the Lawson Criterion as regards ion density and containment time is fulfilled. Magnetic field is released and the ions pass on to the next minimum cross-section.

It is to be pointed out that ions could be initially heated to about 10° K. by circulating them through the accelerator before being trapped in the magnetic well. As they are brought to a focal plane at the minimum cross-section, they are neutralized, some of the neutralized atoms are left in highly excited atomic states and as these atoms enter the magnetic well they become easily reionized and trapped.

More neutral atoms can be introduced in the magnetic well at right angles to the magnetic field lines by means of an injector as shown in the diagram so as to satisfy Lawson's Criterion. These neutrals can be ionized by using the tube "DD" as an ionizer as shown in the diagram and thereby can be easily trapped in the magnetic or potential well.

In the potential well, the plasma is compensated with approximately $N_i \approx N_e$ where $N_i$ and $N_e$ are ion and electron densities respectively, but only for a short time due to the fact that the ions have already been brought to a dense focus by this device instead of bringing a dispersed plasma to a high density as is usually done with the consequent loss of energy as Bremsstrahlung.

The magnetic well system is modified in such a way that the plasma finds itself in a true potential well with the field strength increasing outwards and thus the leakage is eliminated and the confinement time is larger than the ion-ion collision time.

Once the confinement time is over, the tap is released by collapse of the potential and the ions are cooled through the cooling system. In the process of cooling the ions are attracted to the virtual cathode by a voltage generated at the grid at the maximum cross-section of the accelerator device which is turned on and the process is repeated.

The collisions between the hot ions of the plasma and the residual atoms of cold background result in the sbustitution of a cold ion for a very hot ion and in the place of the hot ion a very fast neutral ion is produced which escapes from the magnetic well, whereas the cold ion moves slowly and is readily deflected and scattered through the mirrors and lost.

In this device the ion density has been considerably increased in the focal plane at minimum cross-section, thus the confinement time can be correspondingly reduced, thereby minimizing the charge exchange phenomena. To minimize further the charge exchange phenomena, the background atoms and impurities can be further reduced by working at a pressure below $10^{-12}$ torr.

The various conventional methods of trapping can be used taking into account the injection angle of the ions so as to make the loss cone for the ions as small as possible. Also, an electron cloud is generated in the hollow tube "DD" as shown in the figures; this creates a radial electric victor "$E_r$" acting at "C", which is at right angles to $E_B$. This rotates the plasma at "C" and due to the electron and ion trips through "C", the rotational energy is also transferred into the thermal energy, thereby helping in the heating of the plasma, which is also heated by the magnetic compression of the plasma. The action of "$E_r$" is also to increase the kinetic energy of the particles at right angles to $E_B$—this reduces considerably the escape of the plasma through the mirror ends. This results in better confinement time for the plasma, i.e., larger than the ion-ion collision time.

PLASMA STABILITY INSIDE THE MAGNETIC WELL

The field inside the plasma is not always zero and the ratio "$\beta$" of the plasma pressure to the magnetic pressure is important in confinement studies; it is of great importance that in a practical reactor the "$\beta$" should be high—(15% or so).

The first loss process is that due to diffusion "$D\perp$" across the lines of force where "$D\perp$" $\sim nT_e^{-\frac{1}{2}}B^{-2} \simeq 10^{-1}$ cm²/sec. where n=particle density
$T_e$=electron temperature and B=magnetic field.

Unfortunately, anamolous diffusion which is often called Bohm diffusion is observed ($D_B$), where $D_B \sim 1/16$ KT/eB where
e=electronic charge.
K=Boltzman's constant
T=plasma temperature This is actually due to low frequency electric field fluctuations in the plasma arising from what are called microinstabilities and are particularly based on drift waves. $D_B \simeq 10^5$ cm/sec. and is too high.

It is therefore important to keep the microinstabilities very low, so that actual diffusion rate to that given by $D_B$ is less than 1/100.

The differential drift of the ions and electrons give rise to gross instabilities, which in turn give rise to large scale motions of the plasma across the lines of force. Also, excursion of particles larger than the Larmor radius enhance collisional diffusion across the magnetic lines of force.

All the above instabilities are reduced considerably by introducing the magnetic well geometry with the modifications as indicated, whereby achieving the following:

(a) very deep magnetic well
(b) short lines of force
(c) high $\beta$ ($>15\%$)

In the mirror system the confinement depends on the conservation of magnetic moment of the gyrating particles, as this is destroyed by collisions, the confinement time is limited to about the ion-ion collision time, but in our modified mirror system the confinement time is larger than the ion-ion collision time due to the ion and electron oscillations across the field lines as a result of the victor "$E_r$".

The trips of electrons and ions across the electron cloud and through the center of the magnetic well, actually make the well very deep and prevent the (a) differtial drift of ions and electrons and
(b) microinstabilities.

The differential equation for the ion and electron trips through the center of the magnetic well can be written as:

$$\frac{-d\phi}{d\gamma} + \frac{d^2\phi}{d\gamma^2} = K_1 \frac{(1}{\sqrt{\phi}} - \frac{\tau}{\sqrt{1-\phi}}$$

where $$\phi = \frac{V}{V_{c1}}$$

$$= \text{Log}_e \frac{r_{c2}}{r}$$

$V_{C1}$=sometimes voltage due to excess positive ions at the center of the well and other times due to excess of electrons at the center of the well.
V=running voltage
$r_{c2}$=radius of the electron cloud $$K_1 = \frac{2N_e I_e}{4\pi E_o \sqrt{2e/m_e} \; V_C 3/2}$$

$N_i$ and $N_e$ are the number of ion and electron trips respectively.
$I_i$=measured ion current
$I_e$=measured electron current
$n_i$=ion mass
$m_e$=electron mass
e=electronic charge
$E_o$=dielectric constant The actual size of the magnetic well can be scaled up or down depending upon the particle density, gyrating radii of the particles around the magnetic field lines and the strength of the magnetic field used. All the magnetic wells are located at the minimum cross-sections of the device, as indicated in FIG. 1.

Although preferred embodiments of the process have been described and schematically illustrated, modifications and other embodiments which would be obvious to one having ordinary skill in the art are intended to be covered by the scope and spirit of the following claims.

What is claimed is:

1. A process for generating nuclear fusion, comprising the steps of:

creating non-neutralized Tritium and Duterium ions within an accelerator by impinging laser energy on a Duterium-Tritium pellet, propelling said ions within the accelerator from first positions to each relative minimum cross-section positions of the accelerator, injecting electrons at each relative minimum cross-section of the accelerator to neutralize the space charge of said ions and to create a plasma, compressing and confining said plasma at a maximum density by electromagnetic fields, creating an electron cloud at each relative minimum cross-section encircling said plasma, whereby said ions of said plasma oscillate toward and away from electrons in said electron cloud and whereby the confinement time and density of ions at each relative minimum cross-section is sufficient to generate nuclear fusion, extracting the heat of fusion as useful energy, releasing the magnetic fields subsequent to fusion and allowing the escape of the products of fusion from each relative minimum cross-section, extracting electrons and waste products of fusion from the accelerator leaving solely ions for circulation within the accelerator, and passing said ions through magnetohydrodynamic coils to generate electrical current.

2. The method as recited in claim 1, and further including the step of: evacuating said accelerator to create a vacuum therein $10^{-13}$ Torr.

* * * * *